(12) United States Patent
Enderby (10) Patent No.: US 7,438,526 B2
(45) Date of Patent: *Oct. 21, 2008

(54) LARGE RADIAL MOVEMENT COMPLIANT SEAL

(75) Inventor: Christian H Enderby, London (GB)

(73) Assignee: Rolls-Royce plc, London (GB)

( * ) Notice: Subject to any disclaimer, the term of this patent is extended or adjusted under 35 U.S.C. 154(b) by 273 days.

This patent is subject to a terminal disclaimer.

(21) Appl. No.: 11/258,201

(22) Filed: Oct. 26, 2005

(65) Prior Publication Data

US 2006/0210392 A1   Sep. 21, 2006

(30) Foreign Application Priority Data

Oct. 28, 2004   (GB) .................................. 0423923.2

(51) Int. Cl.
*F01D 11/00*   (2006.01)
(52) U.S. Cl. ...................... 415/231; 277/355
(58) Field of Classification Search ................ 277/355; 415/231
See application file for complete search history.

(56) References Cited

U.S. PATENT DOCUMENTS

| | | | |
|---|---|---|---|
| 5,474,305 A | 12/1995 | Flower | |
| 5,597,167 A * | 1/1997 | Snyder et al. | 277/355 |
| 5,799,952 A * | 9/1998 | Morrison et al. | 277/355 |
| 6,168,162 B1 | 1/2001 | Reluzco et al. | |
| 6,244,599 B1 * | 6/2001 | Braun et al. | 277/352 |
| 6,572,115 B1 | 6/2003 | Sarshar et al. | |
| 6,669,203 B1 | 12/2003 | Mortzheim | |
| 6,685,427 B1 * | 2/2004 | Dhar et al. | 415/173.3 |
| 6,695,314 B1 | 2/2004 | Gail et al. | |
| 6,918,739 B2 * | 7/2005 | Addis | 277/355 |

FOREIGN PATENT DOCUMENTS

| | | |
|---|---|---|
| EP | 0 778 431 A1 | 6/1997 |
| EP | 1653129 A1 * | 5/2006 |
| JP | A 11-257013 | 9/1999 |

* cited by examiner

*Primary Examiner*—Richard Edgar
(74) *Attorney, Agent, or Firm*—Oliff & Berridge, PLC (57) ABSTRACT

A compliant seal provides a seal between an upstream region and a downstream region. The seal includes: a seal pack carrier defining a slot, the seal pack carrier having an upstream face and a downstream face; and a seal pack slideably mounted within the slot, the seal pack having an upstream face and a downstream face. The seal pack carrier and seal pack define a high-pressure plenum which abuts the downstream side of the seal pack, and which can be pressurized to apply a force to the seal pack in the upstream direction.

10 Claims, 13 Drawing Sheets

LARGE RADIAL MOVEMENT COMPLIANT SEAL

The present invention relates to compliant seals used to provide sealing between fluids at different pressures. In particular, the present invention relates to compliant seals used to provide sealing between an upstream region of high pressure gas and a downstream region of relatively low pressure gas, especially where the regions are bound by relatively rotatable components such as the shaft and casing of a gas turbine engine.

Compliant seals in gas turbine engines utilise a continuous annular sealing face, which seals against, typically, a rotating shaft. This sealing surface is formed from a number of flexible elements, which project radially inwards from a rigid annular carrier, to which they are fixed. The element's flexibility allows the sealing face, formed by free floating radially inner ends of the elements, to be compliant, and so accommodate movement of the shaft relative to the annular carrier, which is typically mounted to an engine casing. Such movement arises from eccentric movement of the shaft relative to the casing, or unequal growth of the shaft relative to the casing.

Brush seals and leaf seals are both examples of such compliant seals. Brush seals utilise an annular array of bristles, many layers thick, and are well known in the art. Leaf seals utilise an annular array of radially inward pointing planar 'leaves', typically a single layer thick. These leaves comprise plates, which are very thin in section, so that they can flex radially, but are axially stiff, to avoid the problem of pressure stiffening associated with brush seals.

U.S. Pat. No. 5,474,305 describes a seal assembly suitable for low speed operation in which the bristle pack is slideably located in a radial channel such that it floats radially. This allows the clearance between backing plate and sealing surface to be reduced, as the brush pack is itself able to move to maintain sufficient clearance between the shaft and backing plate. However, in operation, the pressure differential across the brush pack pushes it against the downstream face of the radial channel. This causes wear between the brush pack and rear face of the channel, and locks the brush pack, increasing the clearance gap required.

The present invention addresses the limitations of the prior art cited above.

According to the present invention, a compliant seal for sealing between an upstream region and a downstream region comprises, a seal pack carrier defining a slot, the seal pack carrier having an upstream face and a downstream face, and a seal pack slideably mounted within the slot, the seal pack having an upstream face and a downstream face, wherein the seal pack carrier and seal pack define a high-pressure plenum which abuts the downstream side of the seal pack, and which can be pressurised to apply a force to the seal pack in the upstream direction.

Preferably, the first flow communication means are provided between an external surface of the seal pack carrier and the high-pressure plenum for supply of a pressurised fluid to the plenum. Alternatively, the first flow communication means are provided between the upstream face of the seal and the high-pressure plenum, and may be defined between the seal pack and seal pack carrier.

The first flow communication means may comprise passages within the seal pack carrier retaining wall.

In a preferred embodiment of the present invention, the seal pack further comprises a compliant annulus and a backing plate, spaced apart to define a seal pack plenum, and secondary flow communication means between the seal pack plenum and the high-pressure plenum.

The seal pack may comprise an annular leaf pack or an annular bristle pack.

The seal may further comprise discrete sealing means, preferably between the seal pack and seal pack carrier. The discrete sealing means may comprises a circular piston ring, or tubular brush seal.

The seal may be provided with anti-rotation means to prevent relative rotation between the seal pack and seal pack carrier. The anti-rotation means may comprise at least one pin fixed to the seal pack carrier pack, and at least one cooperating recess in the seal pack or at least one pin fixed to the seal pack, and at least one cooperating recess in the seal pack carrier.

Biasing means may be provided between the seal pack and seal pack carrier, which urge the seal pack against the seal pack carrier. The biasing means may comprise a cockle spring.

According to a further embodiment of the present invention there is provided a gas turbine engine which, during operation of the engine, provides a first upstream region with a fluid at a higher pressure than a fluid in a second downstream region, wherein the upstream region is separated from the downstream region by a seal, the seal comprising a seal pack carrier defining a slot, the seal pack carrier having an upstream face and a downstream face, and a seal pack slideably mounted within the slot, the seal pack having an upstream face and a downstream face, wherein the seal pack carrier and seal pack define a high pressure plenum which abuts the downstream side of the seal pack, wherein first flow communication means are provided between the high pressure plenum and a region of the gas turbine engine which, during operation of the gas turbine engine, contains fluid at higher pressure than fluid in the downstream region adjacent the seal such that a force is applied to the seal pack in the upstream direction.

The first flow communication means may be provided between the upstream region adjacent the seal and the high-pressure plenum, or between a separate high-pressure region and the high-pressure plenum.

The seal may be adapted so that a light damping load is applied to the seal pack, which urges the seal pack against the seal pack carrier during operation of the engine.

The invention will now be described in more detail with reference to the accompanying drawings in which.

Figure 1:
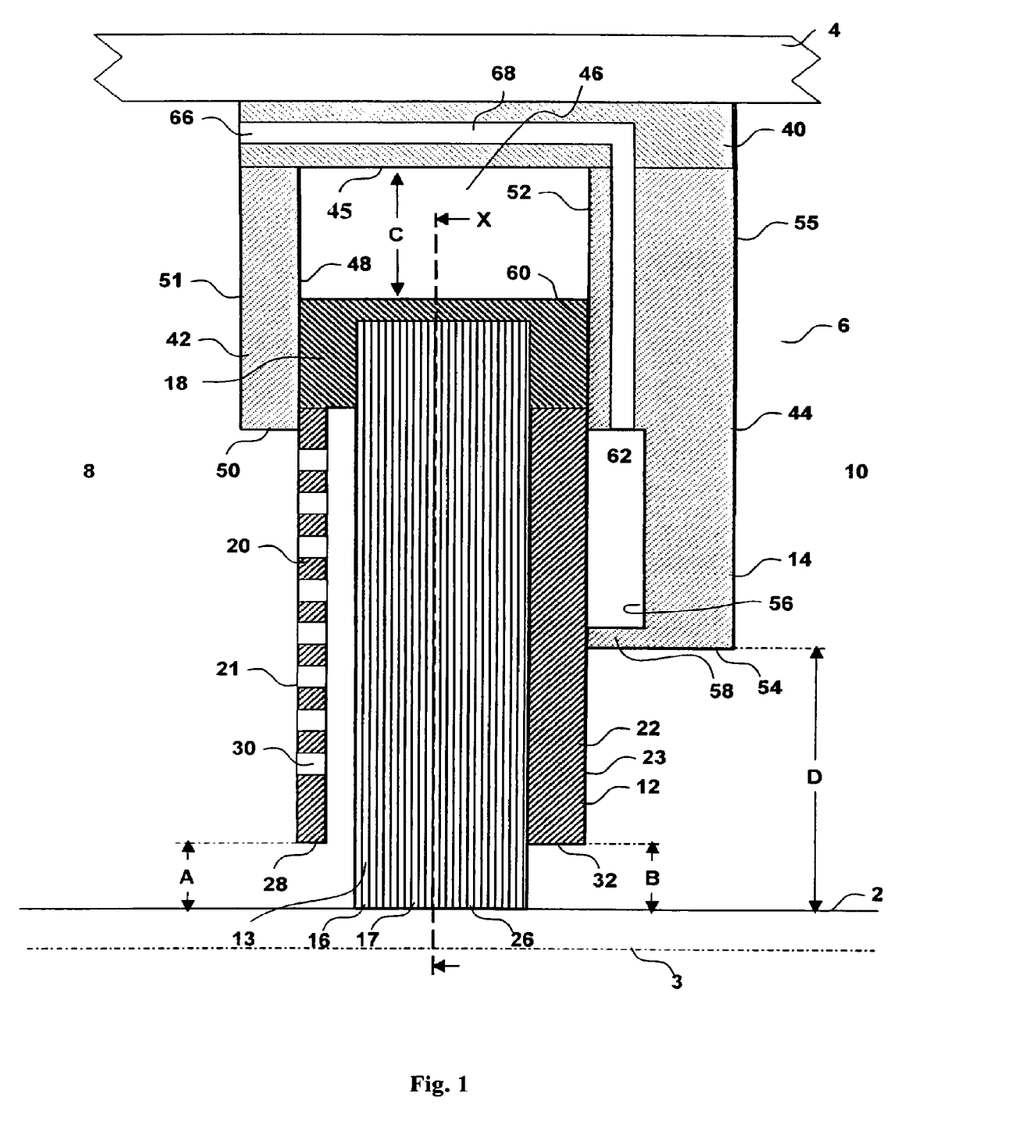
FIG. 1 illustrates a cross-section through a compliant seal according to a first embodiment of the present invention.

FIG. 1 shows a cross-section through part of a gas turbine engine, in which a rotatable shaft 2, with axis 3, is mounted, within a static, concentric, casing 4. The annular gap between shaft 2 and casing 4 is closed by a compliant seal 6, which seals a first, upstream region 8 from a second, downstream region 10. During operation of the gas turbine, air in the first region 8 is pressurised to a higher pressure than air in the low-pressure region 10. The brush seal 6 isolates the regions 8, 10 from one another.

The brush seal 6 comprises a seal pack 12 slideably mounted within an annular seal pack carrier 14.

The seal pack 12 comprises a compliant annulus 13, which comprises a dense annular array of bristles 16, known as a bristle pack 17, bound about its external circumference by a retaining member 18. The seal pack further comprises an upstream annular cover plate 20, which forms the upstream surface 21 of the seal pack 12, and a downstream annular backing plate 22, which forms the downstream surface 23 of the seal pack 12.

Figure 2:
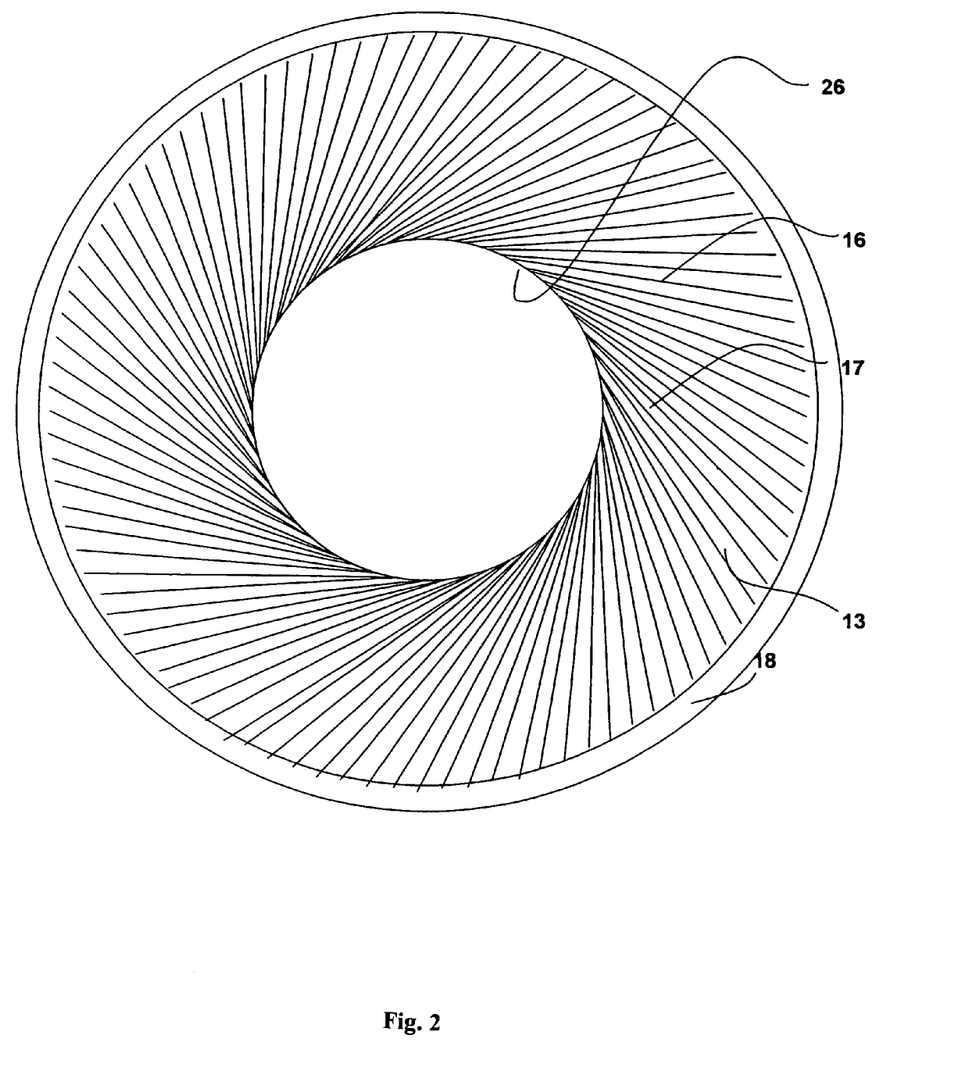
FIG. 2 shows a view, on section X-X, of the seal pack of the compliant seal shown in FIG. 1.

Turning to FIG. 2, which shows a plan view of the brush pack 17, along the section X-X of FIG. 1, the bristles 16 are arranged to point inwards from this retaining member 18 to form a sealing face 26 at their internal diameter. They are inclined at a lay angle to the radial so that a length of each bristle, at its radially inner end, lays adjacent the surface of the shaft 2.

The cover plate 20 is spaced apart from the bristle pack 17. It extends radially inboards to a diameter 28, such that annular gap A is defined between the cover plate 20 and the sealing face 26, sized to accommodate the maximum likely deflection of the sealing face 26 through radial growth of the shaft 2 relative to the seal during engine operation. The plate 20 is made permeable by the provision of an array of through holes 30. The cover plate 20 of the seal pack 12 ensures a still region of air upstream of the bristle pack 17 during engine operation. This is important where there is a large component of swirl in the upstream region 8, however it will be understood that the plate 20 is not an essential part of the invention and may be omitted where such conditions are not prevalent.

The backing plate 22 extends radially inwards from the retaining member 18 to an internal diameter 32 such that annular gap B, similar in size to annular gap A, is defined between the plate 22 and the sealing face 26. The plate 22 supports the downstream face of the bristle pack 17.

The seal pack carrier 14 comprises an annular retaining wall 40, first radial wall 42, and second radial wall 44. The retaining wall 40 is attached to the engine casing 4, and has an internal diameter 45 larger than the seal pack 12 external diameter so that an annular clearance C is formed between the two. This clearance C governs the radial movement of the seal pack 12. It is sized to accommodate the maximum eccentric excursion between shaft 2 and engine casing 4 during engine operation, and the maximum radial growth of the shaft 2 relative to the carrier 14.

The radial walls 42, 44 project radially inwards from, respectively, the upstream and downstream ends of the retaining wall 40, in spaced apart arrangement, to define an annular slot 46, open radially inwards. The slot's upstream surface 48, formed by the downstream surface of the first radial wall 42, extends radially inwards to an internal diameter 50. The upstream surface of the same radial wall 42 forms the external, upstream face 51 of the carrier 14. The slot's downstream surface 52, formed by the upstream surface of second radial wall 44, extends radially inwards to an internal diameter 54, smaller than that of the first wall 42. This defines an annular clearance D about the engine shaft 2, which is similar in size to annular clearance C.

An annular recess 56 is formed in the rear face 52, bound at its inboard circumference by an annular sealing lip 58, and at its outboard circumference by an annular planar bearing surface 60. The downstream surface 55 of the wall 44 defines the downstream face of the carrier 14.

The seal pack 12 is slideably mounted in the carrier slot 46, the cover plate 20 in sliding contact with the upstream slot surface 48, and the backing plate 22 in sliding contact with the downstream slot surface 52. The downstream slot surface 52 engages the seal pack 12 in close conformance to provide a substantially gas tight seal between seal pack 12 and seal pack carrier 14 about the annular sealing lip 58, and about the bearing surface 60. Hence the downstream surface 23 of the seal pack and the recess 56 in the seal pack carrier 14 define an annular plenum, henceforth the high-pressure plenum 62.

The upstream carrier wall 42 is sized so that it engages the seal pack about a continuous annulus over the full range of movement of the seal pack 12 relative to the carrier 14. This overlap is minimised so that the maximum area of the cover plate 20 is left exposed, whilst retaining the seal pack 12 captive within the carrier 14.

The second radial wall 44 is sized so that an annular clearance gap D, similar to annular gap C, about the engine shaft can accommodate the maximum eccentric excursion between shaft 2 and engine casing 4 during engine operation, and the maximum radial growth of the shaft 2 relative to the carrier 14.

A number of through passages 66 are formed in the carrier 14 between the front face 51 and the high-pressure plenum 62. These extend axially through the retaining means 40, from the upstream face 51 to a point outboard of the high-pressure plenum 62, and turn through 90° to travel radially inwards through the downstream carrier wall 44 to the plenum. The passages provide first flow communication means 68 between the upstream region 8 and the high-pressure plenum 62.

During operation of the gas turbine engine, the shaft 2 rotates at high speed relative to the casing 4. At the same time, air in the region 8 upstream of the brush seal 6 is pressurised by a compressor (not shown) to a higher pressure than the downstream region 10. The pressure differential across the seal pack applies a load to the seal pack 12, in the downstream direction, normal to the direction in which the seal pack is arranged to slide within the carrier. Unless countered, this load locks the seal pack 12 against the carrier 14 and prevents radial movement of the pack 12.

The brush seal high-pressure plenum 62, located on the downstream side of the bristle pack 17, is pressurised to substantially the same pressure as this upstream region 8 via the first communication means 68. This applies a force to the seal pack 12 in the upstream direction, normal to the direction in which the seal pack 12 is arranged to slide within the seal pack carrier 14. The force counters the load applied by the pressure differential across the seal pack 12.

The size of the force applied to the seal pack 12 in the upstream direction is governed by the pressure of the air in the plenum, which can be adjusted via the geometry of the communication means 68, and by the surface area of the seal pack 12, which abuts the plenum 62. Hence the force is maximised by increasing the area of the seal pack downstream surface 23 which abuts the high-pressure plenum 62, and optimising the first communication means 68 to reduce pressure loss e.g. by avoiding sharp corners and maximising flow area. Conversely, where a reduced counter-force is required, the area can be reduced, or throttling means introduced into the communication means 68.

Where it is possible to generate an upstream force which is the same size as the downstream force applied to the upstream face of the seal pack, preferably, a small imbalance is maintained, such that a light damping load is applied to the seal pack carrier in the downstream direction to bias it against the downstream surface 52 of the seal pack carrier 14. This allows the seal pack 12 to move with a minimum of static friction while providing damping means to suppress resonance of the seal pack 12 within the seal pack carrier 14.

The present brush seal accommodates two distinct forms of relative movement between the shaft 2 and engine casing 4. Concentric relative movement between the two is accommodated by deflection of the bristle pack 17, as in a conventional brush seal. Eccentric movement between the two is accommodated first by deflection of the bristle pack 17 until the load applied overcomes the static friction between the seal pack 12 and carrier 14, and then by movement of the seal pack within the carrier. This provides a much greater range of accommodation of eccentric movement than has previously been possible. Previous brush seals have used a sliding seal pack to accommodate a certain fixed eccentricity between the first and second components 2,4 but, during engine operation, the large pressure differential across the sliding seal pack has prevented sliding of the seal pack. Hence such seals have been able to accommodate eccentricities arising from engine build, but not eccentricities arising during engine operation, as are generated by, amongst others, gyroscopic forces on the rotating shaft during manoeuvres, by large airframe decelerations, such as aircraft landing, and by uneven thermal growth.

The present invention has the advantage that the seal pack 12 as a whole can move to accommodate excursions by the rotating shaft 2 from the 'perfect' axis of rotation, located concentric with the casing 4, in particular during engine operation. As a result, the clearance gap B between backing plate 22 and sealing face 26 is reduced compared with a conventional brush seal or the pressure-balanced brush seal of the prior art. This reduction in the clearance gap B reduces the axial load on the bristle pack 17, allowing bristles 16 to move freely, and hence wear of the bristles is reduced. The primary leakage through the seal is also reduced as the unsupported annulus of bristles 16 adjacent the sealing face is minimised, which ensures the bristle pack 17 is given the maximum support possible by the backing plate 22. The reduced clearance B also reduces bristle stress and so maximises the pressure difference that the seal 6 can maintain.

Figure 3:
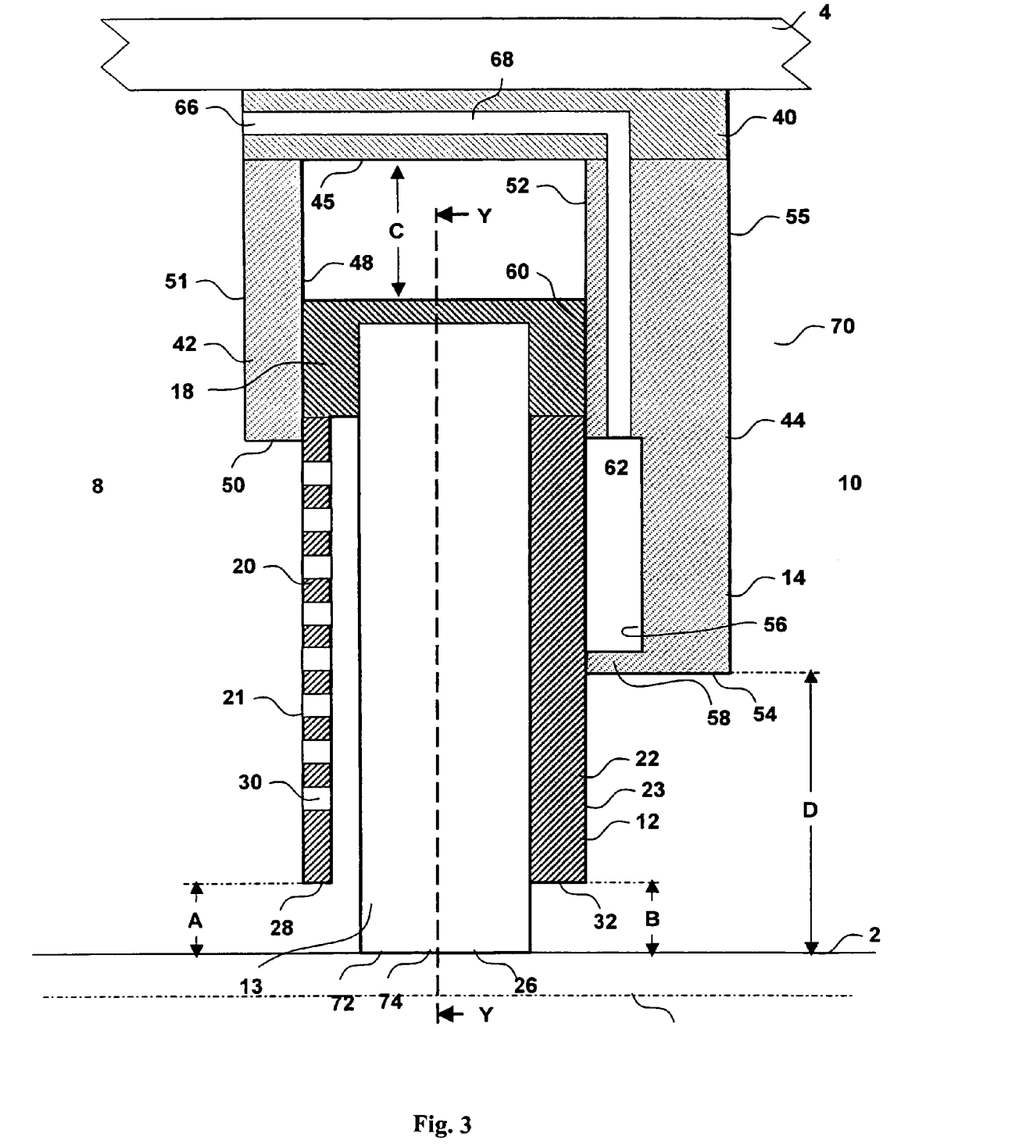
FIG. 3 shows a cross-section through a compliant seal according to a second embodiment of the present invention.
Figure 4:
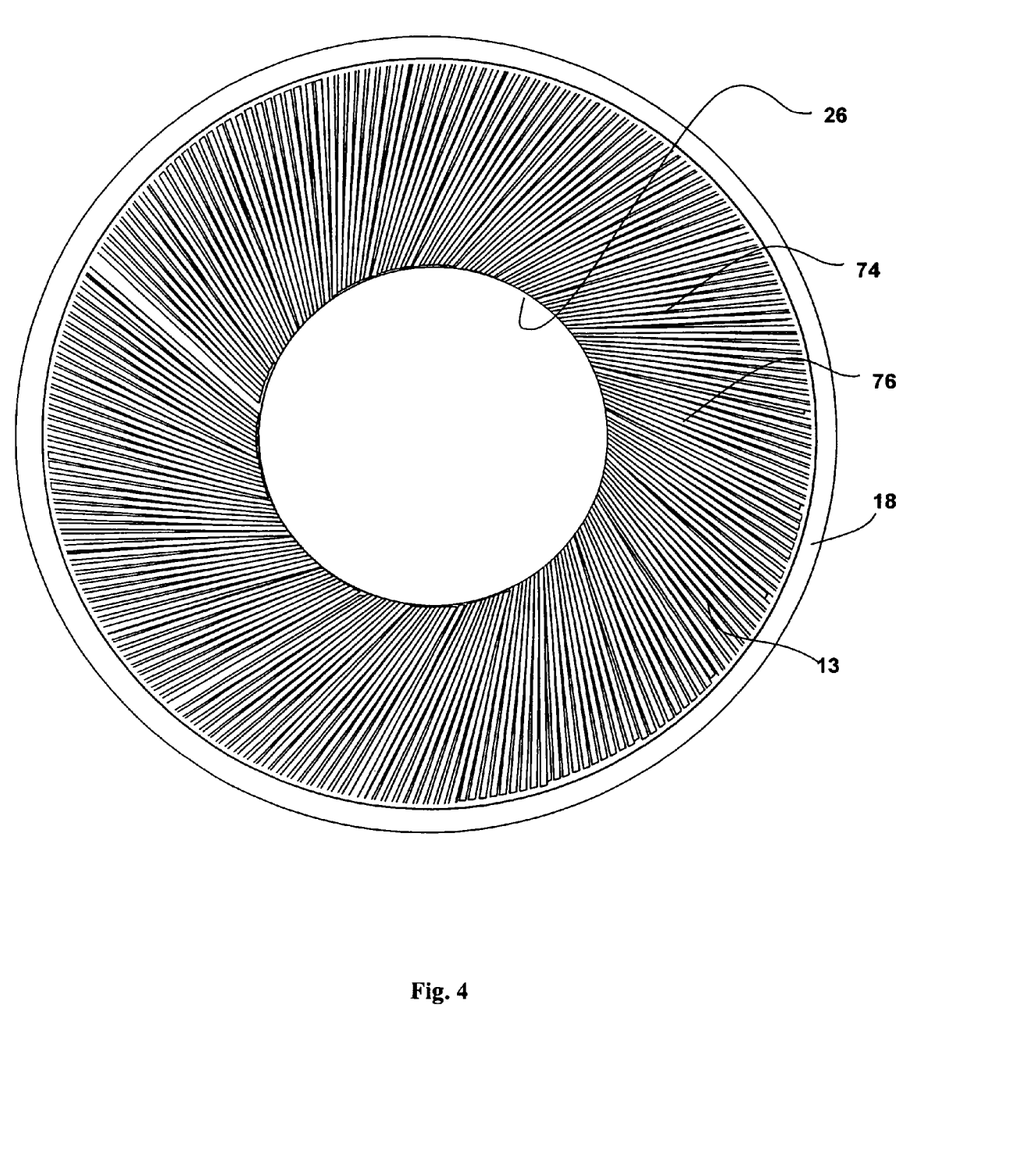
FIG. 4 shows a view, on section Y-Y, of the seal pack of the compliant seal shown in FIG. 3.

An alternative version of the present invention is shown in FIGS. 3 and 4. FIG. 3 shows a cross section through a compliant seal 70 according to the present invention, in which the compliant annulus 13 is provided by a leaf seal rather than a brush seal as per the compliant seal 6 of FIGS. 1 and 2. The seal 70 is otherwise substantially the same as the previous seal 6, and like items carry like reference numerals.

In the compliant seal 70 of FIGS. 3 and 4, the compliant annulus 13 comprises an annular single layer of planar plates 72, called the leaf pack 74, in place of the bristle pack 17 of the seal 6 of FIGS. 1 and 2. The leaf pack 74 will be better understood if reference is made to FIG. 4, which shows a view on cross section Y-Y.

The plates 72 project inward from the retaining member 18, at a lay angle to the radial. They are arranged end-on to this lay angle so that they are thin in the direction of required compliance and can bend to accommodate relative movement between the shaft 2 and the casing 4, but are long in the axial direction to resist axial deflection.

In the case of a leaf seal 70, the amount of relative movement between shaft 2 and casing 4 that can be accommodated by the flexibility of the plates 72 is greatly enhanced by allowing the leaf pack 74 to move radially relative to the seal pack carrier.

Figure 5:
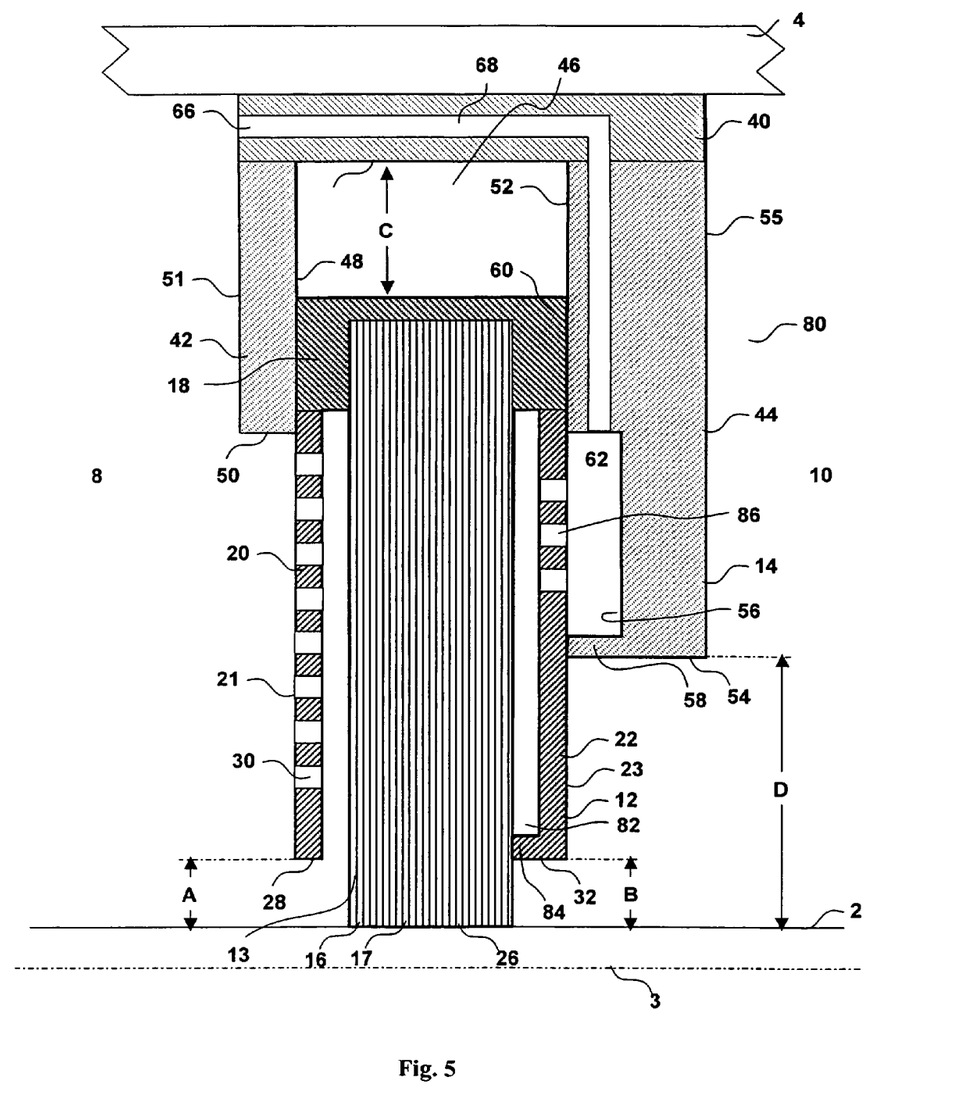
FIG. 5 shows a cross-section through a compliant seal according to a further embodiment of the present invention.

FIG. 5 shows a further embodiment of a seal 80 according to the present invention in which the backing plate 22 of the seal pack 12 is adapted to provided a plenum on the downstream side of the bristle pack 17, henceforth the seal pack plenum 82. The seal 80 of FIG. 5 is similar to the seal 6 of FIG. 1, and like items carry like reference numbers.

The backing plate 22 of the seal 80 is spaced apart from the bristle pack 17, except at its inner diameter 32 where a continuous annular lip 84 engages the bristle pack 17 to support the inner ends of the bristles 16 adjacent the sealing face 26. Hence the seal pack plenum 82 is formed between the backing plate and bristle pack 17 immediately downstream of the bristle pack 17. Secondary flow communication means are provided between this plenum 82 and the high-pressure plenum via an array of through holes 86 in the backing plate 22. The holes 86 are arranged so that they always lie within the high-pressure plenum 62, and are not occluded over the range of movement of the seal pack, or in direct communication with the downstream region 10.

During operation of the seal 80, pressurised air supplied to the high-pressure plenum 62 also pressurises the rear face of the bristle pack 17 via the through holes 86 located in the backing plate 22. This prevents the compaction of the bristles 16 against the backing plate 22 by balancing pressures on either side of the pack 17 and ensures that the full length of the bristle 16 can flex to accommodate movement at the sealing face 16. This prevents localised bending and the associated, accelerated, rates of wear of the bristles 16.

It will be understood that the seal pack plenum 82 is equally well suited for use with a seal 70 as shown in FIG. 3, which utilises a leaf pack 74 instead of the seal pack 17 of the present invention. In such a seal 70, the seal pack plenum is used to control the flow field through the leaf pack 74.

Figure 6:
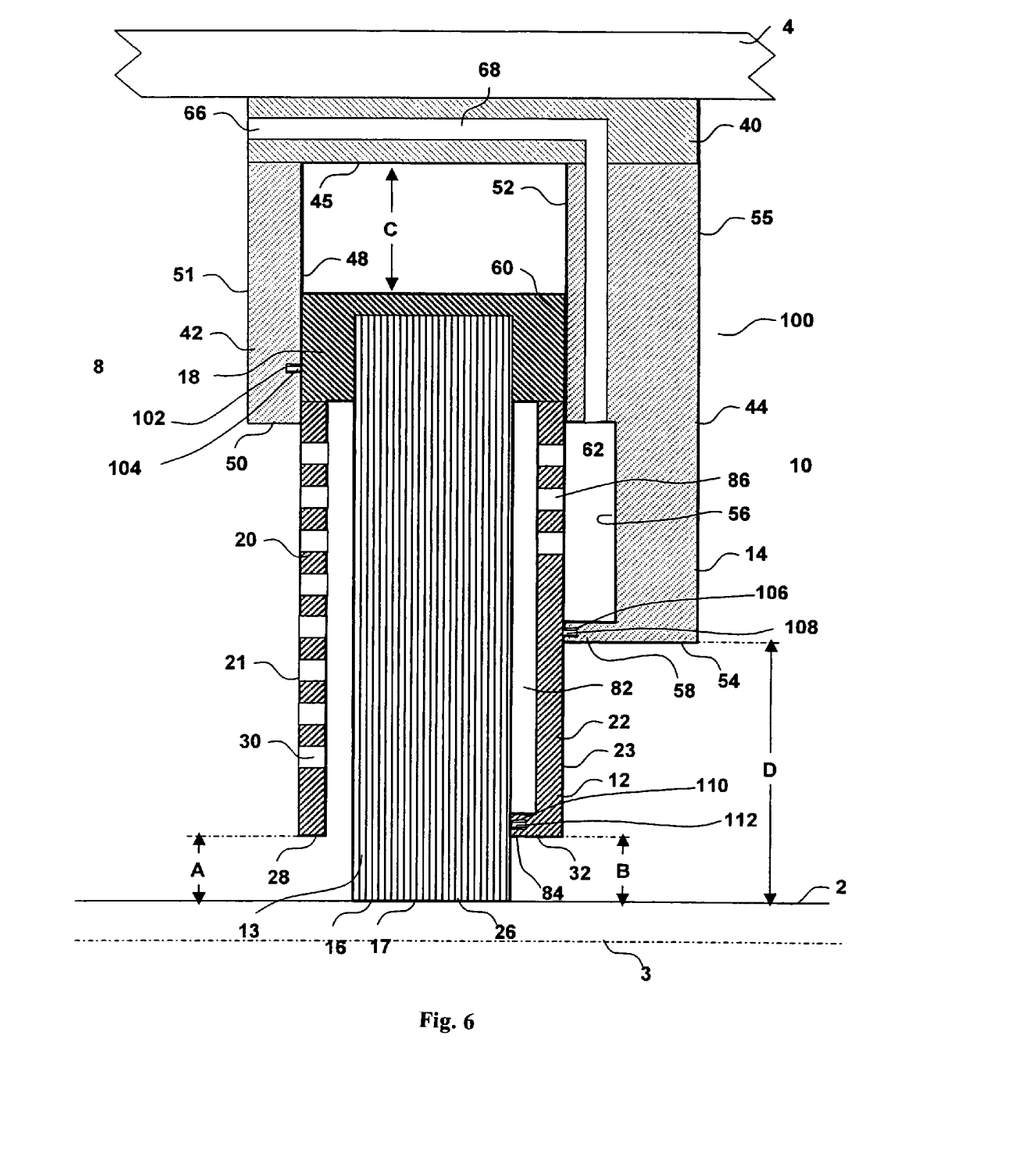
FIG. 6 shows a cross-section through a compliant seal according to a further embodiment of the present invention.

FIG. 6 shows a seal 100 according to a further embodiment of the present invention. The seal 100 is similar to the seal 80 of FIG. 5, and as such, like parts carry the same reference numerals, however, it is provided with discrete sealing means between the seal pack 12 and carrier 14. Because the sliding arrangement of the seal pack 12 and seal pack carrier 14 introduces a potential leakage path between the high pressure and low pressure regions 8, 10 it is important that the sealing interfaces between the seal pack 12 and the seal pack carrier 14 seal at least as efficiently as the main leakage path, the sealing face 26. This is possible using very accurately machined surfaces, but in a preferred embodiment of the present invention, secondary sealing means are provided between the seal pack 12 and the seal pack carrier 14. As before, the seal pack 12 is slideably mounted within the seal pack carrier 14, however, the seal pack does not bear directly upon the upstream and downstream faces 48,52 of the annular slot. Instead, small annular slots are provided in both faces 48,52. A first annular slot 102 is formed in the upstream bearing face 48, and an annular sealing element 104 is located within this slot 102, to provide a first discrete seal between the seal pack 12 and seal pack carrier 14, between the upstream slot surface 48 and upstream face 21 of seal pack. A second annular slot 106 is provided in the downstream annular sealing lip 58, and a similar annular sealing element 108 is located therein to provide a second discrete seal between the seal pack 12 and seal pack carrier 14, between the downstream slot surface 52 and the downstream face of the seal pack 23. A third annular slot 110 is provided in the seal pack backing plate annular lip 84, to provide a third discrete sealing means between the brush pack 17 and the backing plate 22.

Figure 7:
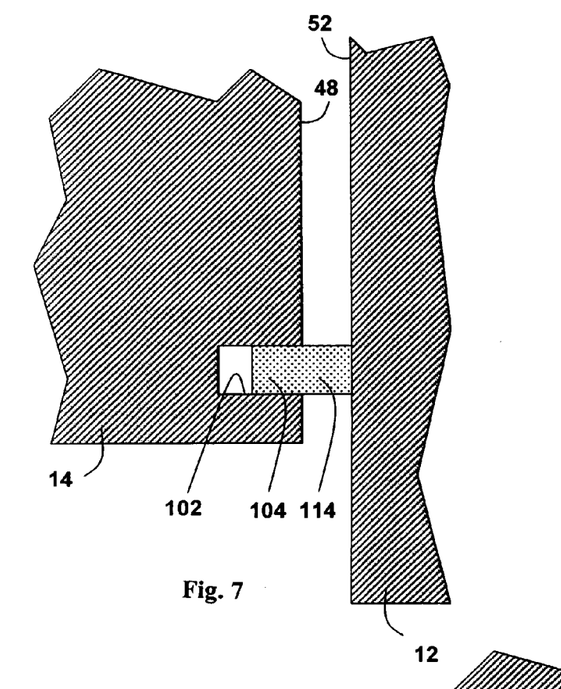
FIG. 7 shows, in more detail, a first embodiment of the sealing arrangement used on the compliant seal of FIG. 6.

FIG. 7 shows one of the annular slots 102 in more detail, and in particular, a first embodiment of the annular sealing element 104 located therein. According to this first embodiment, a circular piston ring seal 114 is provided in the slot, which is substantially the same thickness as the width of the annular slot 102,106. The piston ring is sprung outwards from the slot so that it engages the forward surface of the seal pack 12 throughout its range of movement, accommodating axial discrepancies therebetween. This provides a seal between the ring 114 and the seal pack 12, and between the ring 114 and the sides of the slot 102 and hence the seal carrier 14. Such seals are well known in the art and will not be described further herein.

Figure 8:
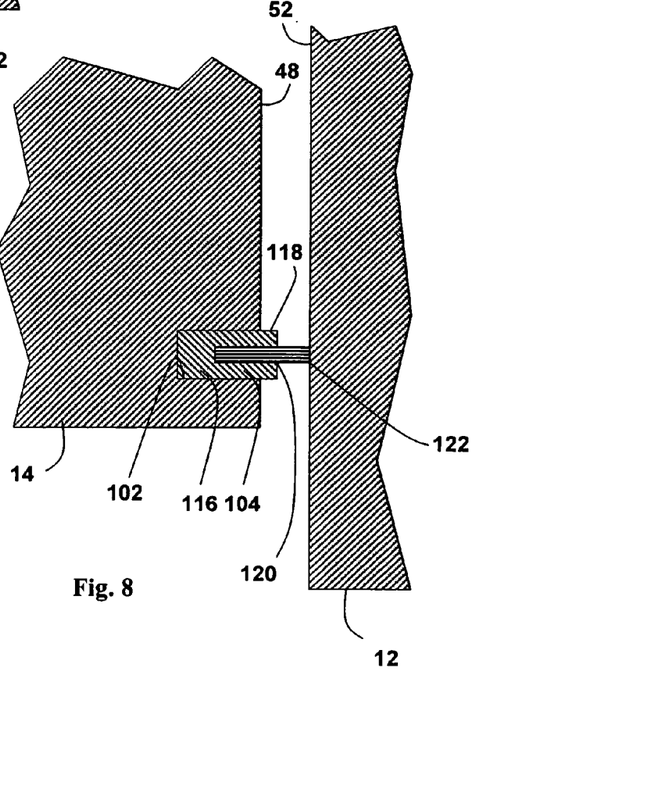
FIG. 8 shows, in more detail, a second embodiment of the sealing arrangement used on the compliant seal of FIG. 6.

FIG. 8 shows in more detail one of the annular slots 102 and a second embodiment of the annular sealing element 104 located therein. According to the second embodiment, a tubular brush seal 116 is provided in the slot 102 comprising a carrier ring 118, which holds an annular array of bristle 120 which project axially forward therefrom. The bristles are free at their axially forward end 122 and spring against the seal pack 12 to provide a seal between the seal pack 12 and carrier 14, and to accommodate axial discrepancies therebetween.

Either of the embodiments of the annular sealing element shown is able to provide a seal at least as good as that between the shaft 2 and bristle pack 17 because the motion between the seal pack 12 and carrier 14, and between the backing plate 22 and bristle pack 17 is much slower than the speed of rotation of the shaft 2 relative to the bristle pack sealing face 26.

It will be understood that discrete seals as described above are applicable to all seals according to the present invention. Other sealing means may be utilised, such as 0-rings where operating conditions permit. The discrete sealing means may be used selectively, for example, the third discrete sealing means on the seal pack may be omitted where the seal pack plenum is omitted.

Figure 9:
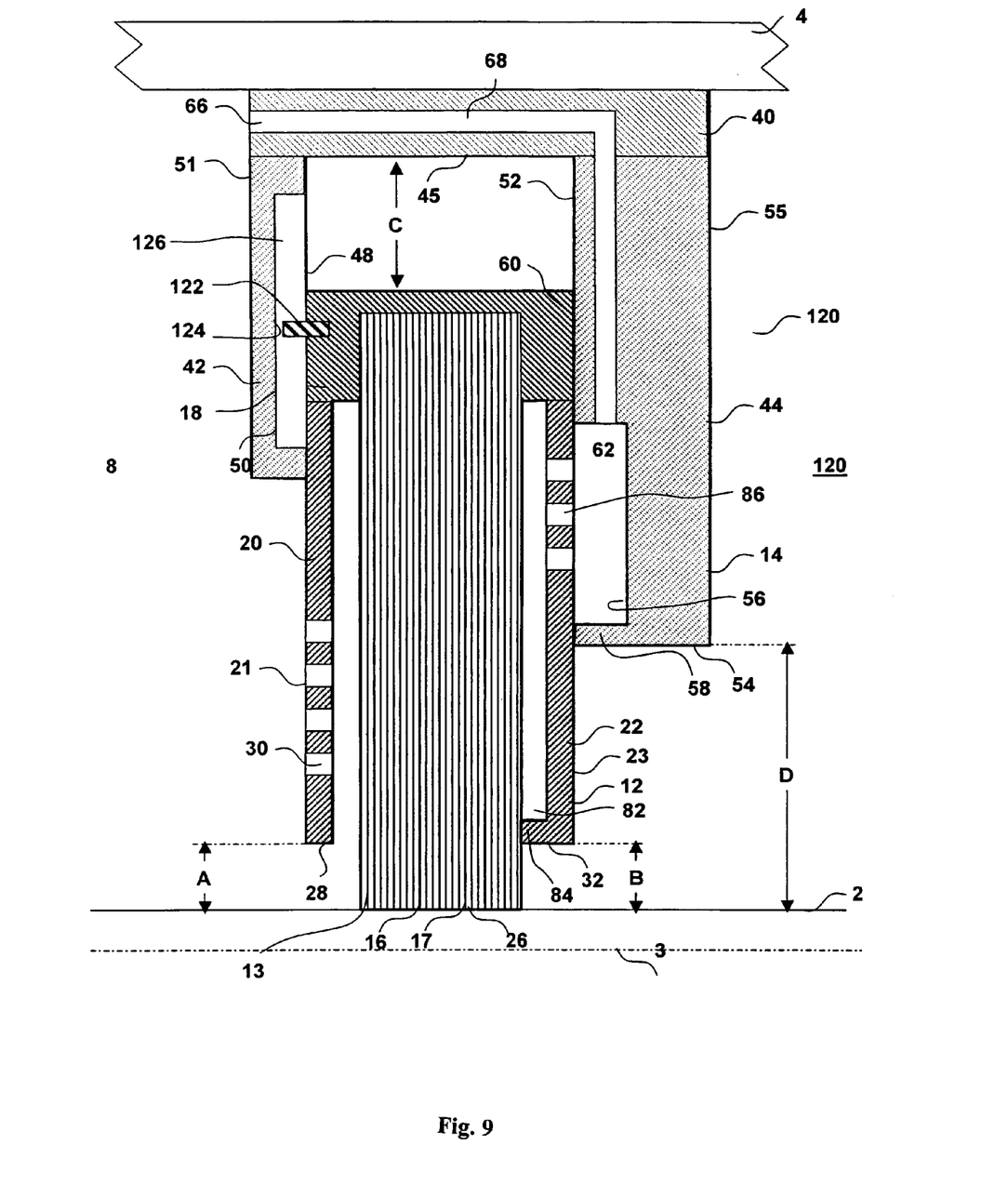
FIG. 9 shows a cross-section through a compliant seal according to a further embodiment of the present invention.

Turning now to FIG. 9, a seal 120 according to a further embodiment of the present invention is shown. The seal 120 is substantially the same as the seal 80 of FIG. 5, and like features have the same reference numbers, however, the seal pack 12 is provided with anti-rotation means to ensure that it does not rotate in sympathy with the rotating shaft 2.

The seal 120 has an anti-rotation feature, which comprises a pin 122, which is mounted in the upstream wall of the seal pack 12. The pin 122 projects axially forwards into a cooperating blind feature 124 formed in the downstream face of the seal pack carrier 14. In the present embodiment, a single pin 122 is used which extends into a radial slot 126. The slot is approximately twice the radial length as the radial gap C between seal pack 12 and seal pack carrier 14, and the same width as the pin 122. Hence, the brush pack can slide radially along the slot 126, and pivot about the pin to accommodate the full range of movement of the seal pack 12 within the carrier 14. This arrangement prevents rotational movement of the seal pack 12 by the interaction of the pin 122 and hole 124, as the pin 122 is rotated into contact with the sidewall of the slot 126.

It will be understood that more than one pin 122 and cooperating blind hole 124 can be used where the rotational load applied to the seal pack 12 by the rotating shaft 2 is too great for a single pin arrangement. In such a case, the second hole is a circular cavity of radius similar to annular gap C to prevent any cross-key effects that would serve to lock the brush pack in place. In a further alternative arrangement, a pair of such circular cavities of radius similar to annular gap C may be used.

Similarly, it will be understood that other anti-rotation means could be used such as a pin located in the seal pack carrier 14 arranged to engage a recess in the seal pack 12. It is important though that the anti-rotation means should not hinder the freedom of the seal pack 12 to move within the carrier 14.

Figure 10:
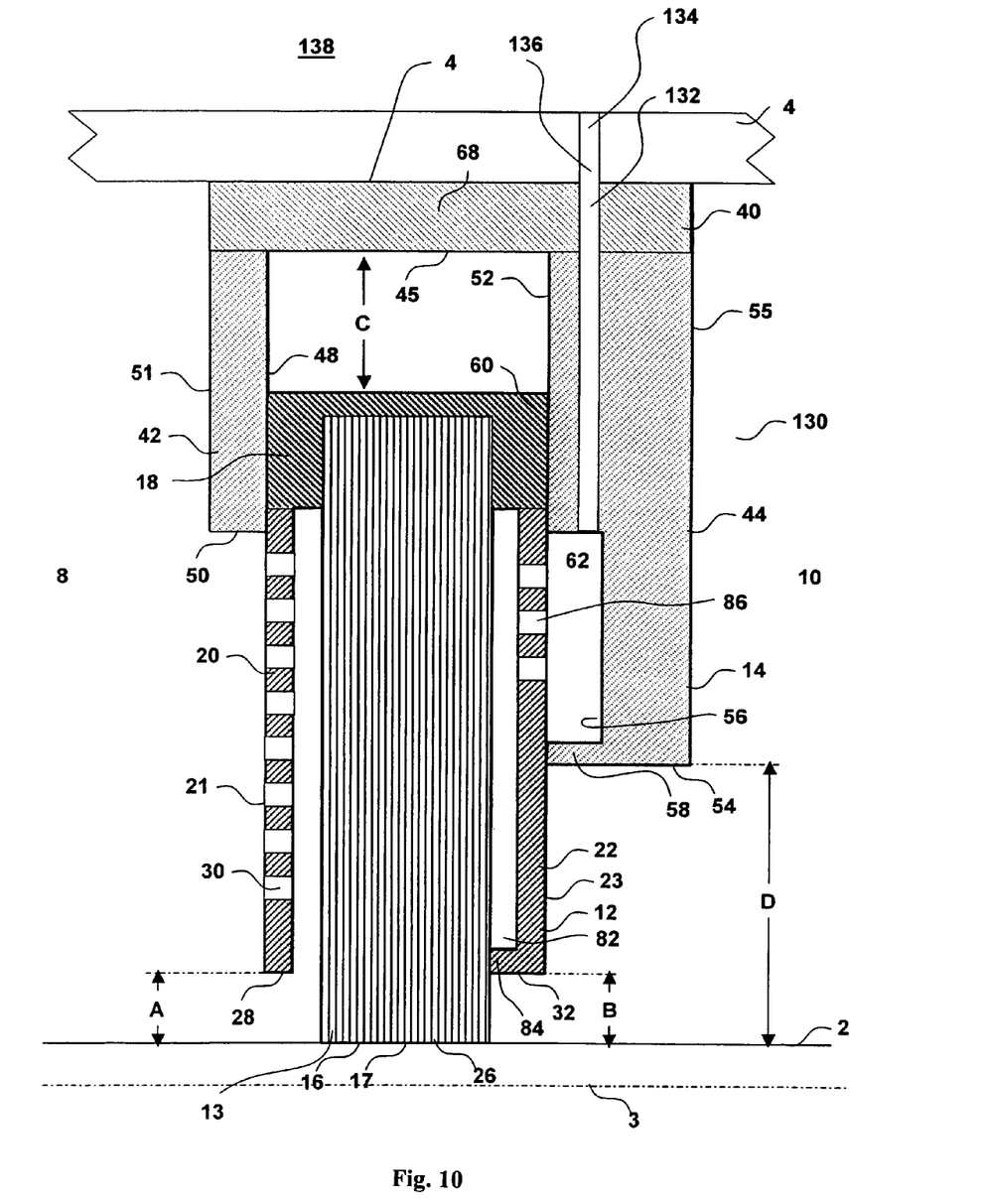
FIG. 10 shows a cross-section through compliant seal according to a further embodiment of the present invention.

FIG. 10 shows a cross-section through a brush seal 130 according to a different embodiment of the present invention. The seal 130 is substantially the same as that of FIG. 1, and like items carry like references, except that the first flow communication means 68 does not supply air from the upstream region 8 of the brush seal. Instead, passages 132 are provided between the plenum 62 and the external face of the external wall of the carrier 14. These passages 132 and cooperating holes 134 formed in the casing 4 provide first flow communication means 68 between the plenum 62 and a separate high pressure region 138 located outboard of the casing, which is supplied with pressurised air during engine operation by a compressor (not shown). Preferably, the high-pressure region 138 operates at a higher pressure than the high-pressure region 8 upstream of the seal 130. This embodiment is useful where the area of the seal pack 12 exposed to the plenum 62 is insufficient, when supplied with air from the upstream region 8, to generate a useful opposing force in the upstream direction. In such a situation, a separate source of air, at higher pressure than the upstream region 8, is used to increase the force available from a given plenum size 62. With such an arrangement, it is possible to substantially balance the loads across the seal pack 12 so that seal pack 12 is pressure balanced, that is to say that the air pressure loads on the front and rear face of the seal pack 12 are substantially the same. Preferably, in such a design, a slight imbalance between loads is maintained so that the seal pack 12 engages the seal carrier 14 such that friction between the two will dampen resonance during engine operation.

Figure 11:
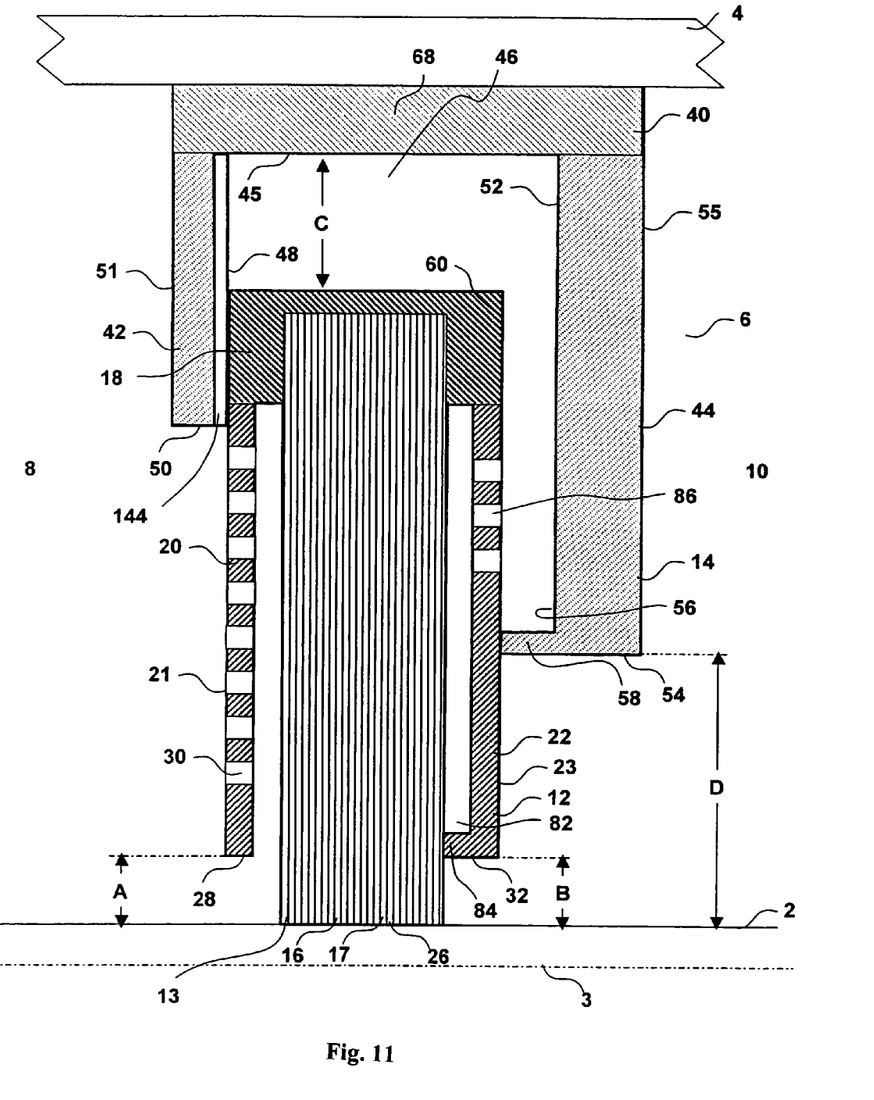
FIG. 11 shows a cross-section through compliant seal according to a further embodiment of the present invention.

FIG. 11 shows a further embodiment of a compliant seal according to the present invention. The seal 140 is similar to the seal 80 shown in FIG. 5, and like features carry like reference numerals, however in the embodiment shown, the annular recess 56 in the downstream wall of the seal pack carrier 14 extends from the retaining wall 40 to the inner lip 58, so that a single annular plenum 142 is formed by the annular gap C between seal pack 12 and retaining wall 40, and the annular recess 56. This single continuous plenum 142 abuts the rear surface 23 of the seal pack 12 and the seal pack's outer circumference. The upstream wall 42 of the seal pack carrier 14 is relieved to define a gap between the upstream wall 42 and the seal pack 14. In the present embodiment, radial flutes 144 are provided, which extend along the downstream surface 48 of the upstream carrier wall 42. The flutes 144 define first flow communication means 68 between the seal pack 12 and seal pack carrier 14, equivalent to the through passages 66 formed in the carrier 14 of FIG. 5, between the upstream region 8 and the plenum 142.

An advantage of this arrangement is that the rear surface of the seal pack 12 only bears on the downstream face of the carrier slot 46 at the sealing lip. This maximises the area of the plenum 56, which abuts the seal pack 12, and so maximises the upstream force applied to the brush pack. The arrangement also minimises the chance of the seal pack binding within the slot 46.

It will be understood that as an alternative, or addition, to the relief of the slot upstream wall 48, the upstream surface of the seal pack 12, can also be relieved to provide the first flow communication means 68.

It will be understood that other arrangements are possible, for example the first flow communication means may comprise through holes formed in the carrier upstream wall 42.

Figure 12:
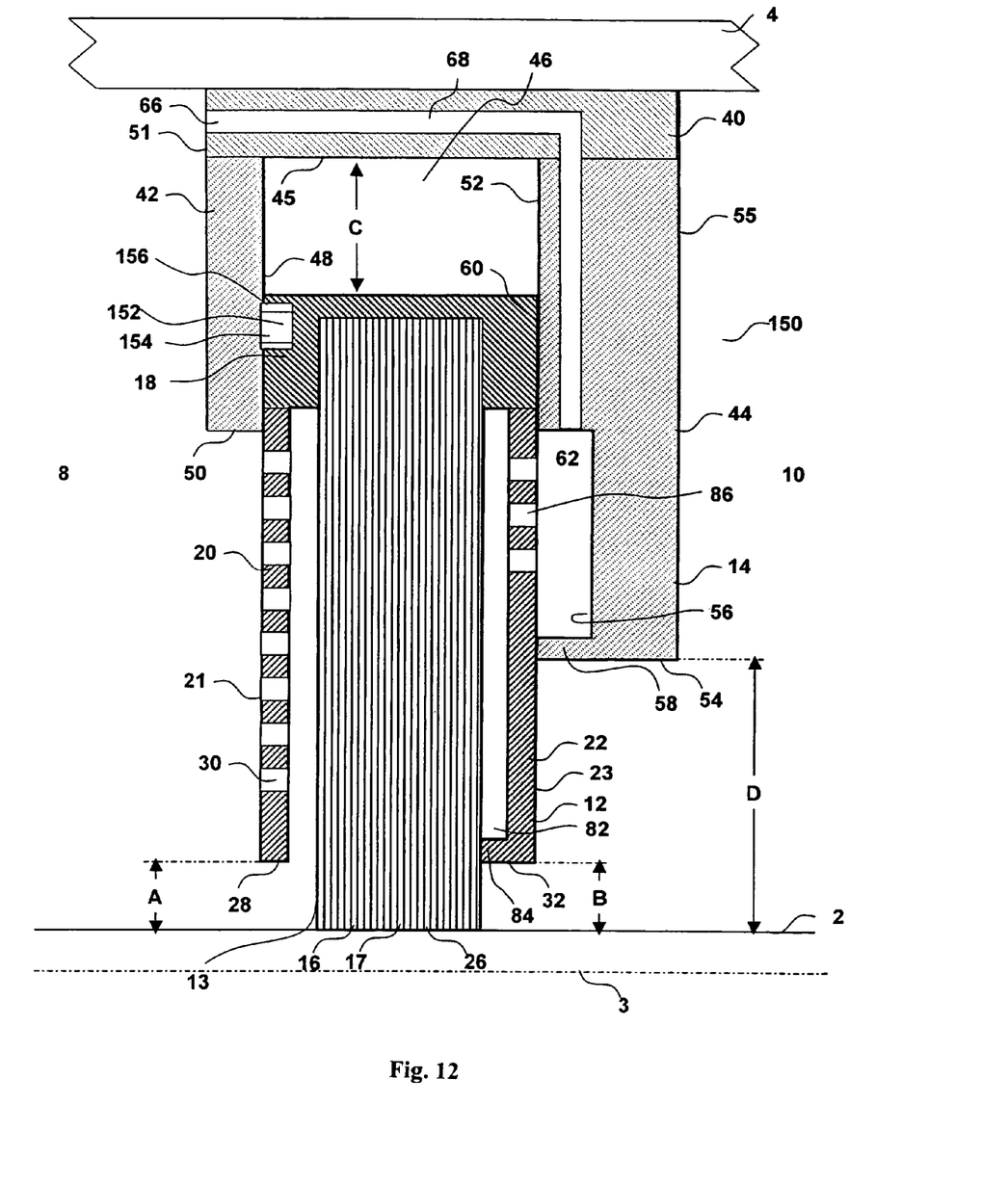
FIG. 12 shows a cross-section through compliant seal according to a further embodiment of the present invention.

FIG. 12 shows a seal 150 according to a further embodiment of the present invention. The seal 150 is similar to the seal 80 of FIG. 5, and as such, like parts carry the same reference numerals, however, the seal 150 is provided with resilient means 152, which serve to bias the seal pack 12 against the carrier 14 when there is no pressure load across the seal 150.

The biasing means comprises a spring 154, which is located in a cooperating recess 156 in the upstream face of the seal pack 12. The spring 154 is loaded in compression so that it pushes against the upstream face 48 of the carrier slot. This urges the seal pack 12 in the downstream direction, normal to the sliding direction of the seal pack within the carrier, ie the direction that the pressure differential pushes the seal pack 12 during engine operation. This applies a small clamping load between the seal pack 12 and seal carrier 14 when there is no pressure differential across the seal 150 so that the seal pack 12 does not drop to the bottom of radial gap C when the engine is not operating. This avoids excessive wear of the sealing face 26 at top dead centre, which would otherwise have to support the entire weight of the seal pack 12, during engine start up.

Figure 13:
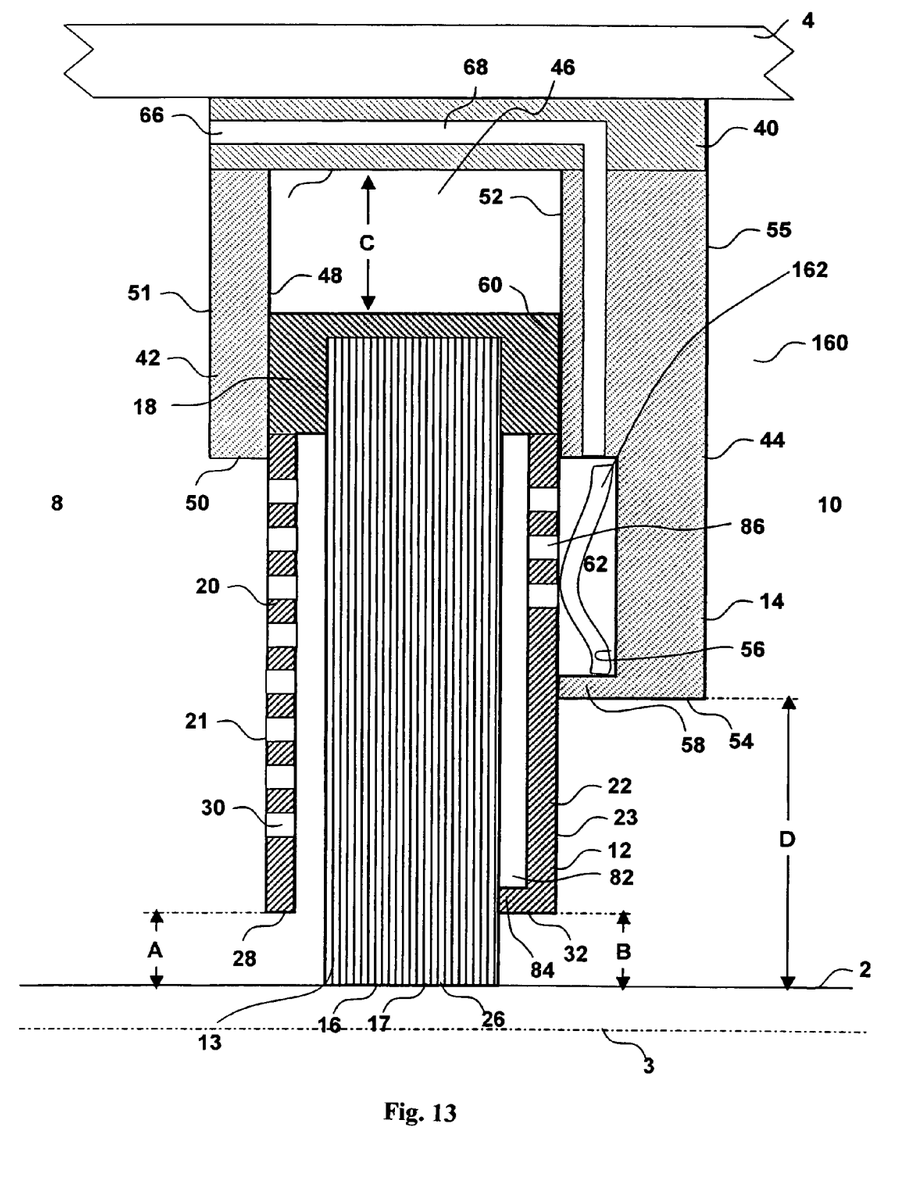
FIG. 13 shows a cross-section through compliant seal according to a further embodiment of the present invention.

FIG. 13 shows a seal 160, which is another arrangement of the seal 150 of FIG. 12, and, again, like items carry like reference numerals. In the seal 160 of FIG. 13, the biasing means 152 comprise an annular 'cockle spring' 162 which lies within the annular recess 56 on the downstream side of the seal pack 12. This cockle spring applies an upstream load to the seal pack normal to the sliding direction of the seal pack 12, so that it is urged against the upstream face 48 of the carrier slot 46. An advantage of urging the seal pack 12 in the upstream direction is that the biasing means 152 augments the force generated by the plenum 62 during engine operation.

Figure 14:
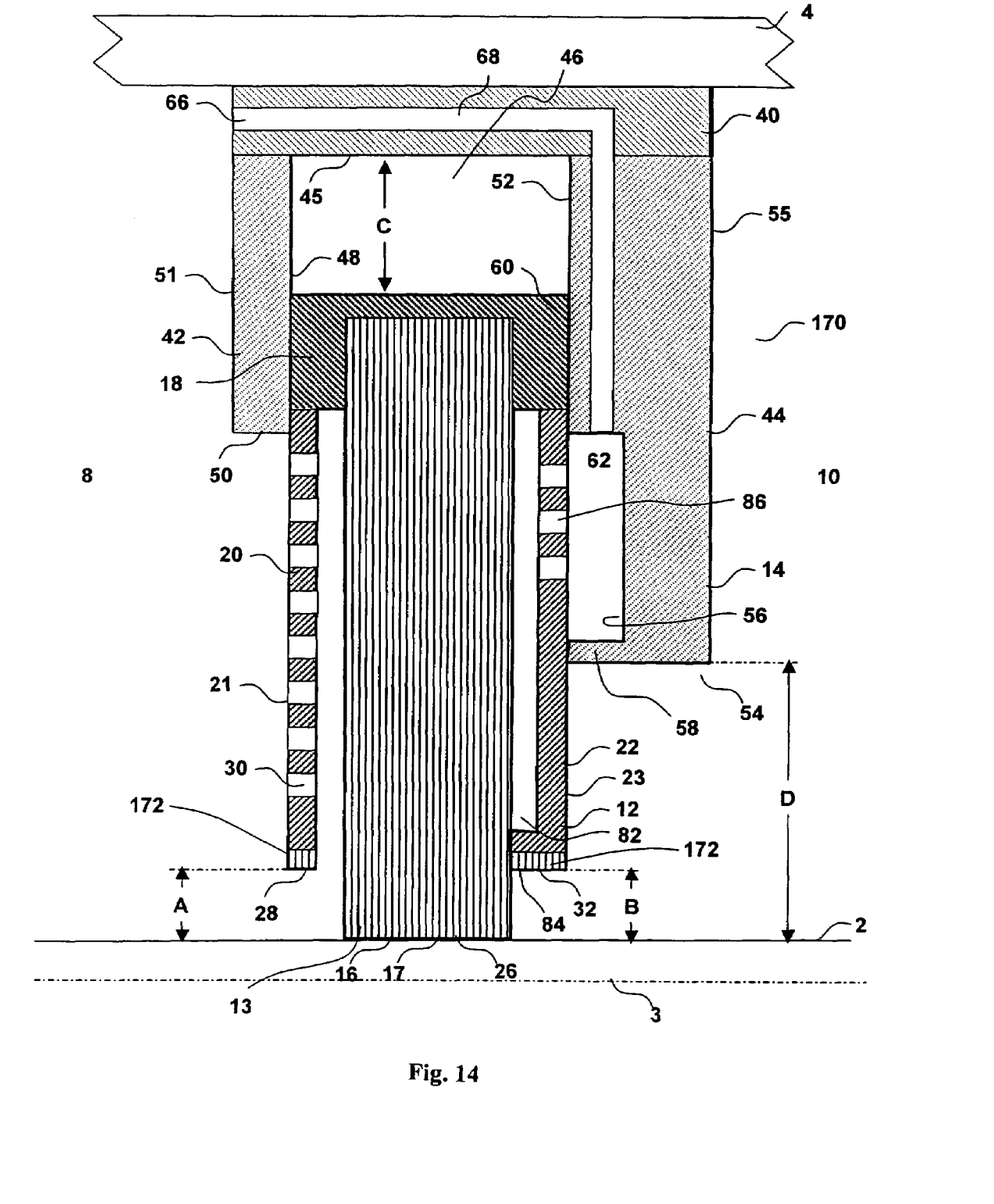
FIG. 14 shows a cross-section through compliant seal according to a further embodiment of the present invention.

FIG. 14 shows a seal 170, which is another embodiment of the seal 80 of FIG. 5, in which like items carry like reference numerals. The radially inner faces 28,32 of the cover plate 20 and backing plate 22 are provided with an abradable coating 172. It will be understood that the internal diameter of each wall when uncoated is larger than the require clearance gap, A and B respectively, so that the coated walls are the correct internal diameter. The coating 172 is significantly softer than the material of the shaft 2 so that the coating 172 wears in preference to the shaft 2 upon contact. This allows the clearance gaps A and B to be run closer as the inner surfaces 28,32 can adapt, via localised rubbing and wear, to accommodate any eccentricities between shaft 2 and casing 4. It also protects the shaft 2 in the event of contact with the seal pack 12.

The coating 172 can be applied in similar fashion to the inner diameter 54 of the carrier walls 42,44, in particular the second radial wall 44.

Although the embodiments described hereinbefore use a single continuous annular chamber 56,82 formed in the walls of the seal pack carrier 14, it will be understood that such a construction is not intended to limit the scope of the present invention. For example, a number of discrete arcuate chambers may be used instead, the radial spokes between them providing an increased downstream bearing surface. Similarly, a plurality of concentric annular chambers may be used.

The invention claimed is:

1. A compliant seal for sealing between an upstream region and a downstream region comprises,
    a seal pack carrier defining a slot, the seal pack carrier having an upstream face and a downstream face,
    and a seal pack slideably mounted within the slot, the seal pack having an upstream face and a downstream face,
    wherein at least a portion of the seal pack carrier and the seal pack are in sliding contact with each other and other portions of the seal pack carrier and the seal pack define a high-pressure plenum which abuts the downstream side of the seal pack, the plenum being pressurised in operation to apply a force to the seal pack in the upstream direction.

2. A seal as claimed in claim 1 wherein first flow communication means are provided between an external surface of the seal pack carrier and the high-pressure plenum for supply of a pressurised fluid to the plenum.

3. A seal as claimed in claim 2 wherein the first flow communication means are provided between the upstream face of the seal and the high-pressure plenum.

4. A seal as claimed in claim 1 wherein the seal pack further comprises a compliant annulus and a backing plate, spaced apart to define a seal pack plenum, and secondary flow communication means between the seal pack plenum and the high-pressure plenum.

5. A seal as claimed in claim 1 wherein discrete sealing means are provided between the seal pack and seal pack carrier.

6. A seal as claimed in claim 1 wherein the seal is provided with anti-rotation means to prevent relative rotation between the seal pack and seal pack carrier.

7. A seal as claimed in claim 1 wherein biasing means are provided between the seal pack and seal pack carrier, which urge the seal pack against the seal pack carrier.

8. A gas turbine engine which, during operation of the engine, provides a first upstream region with a fluid at a higher pressure than a fluid in a second downstream region, wherein the upstream region is separated from the downstream region by a seal, the seal comprising
    a seal pack carrier defining a slot, the seal pack carrier having an upstream face and a downstream face,
    and a seal pack slideably mounted within the slot, the seal pack having an upstream face and a downstream face,
    wherein at least a portion the seal pack carrier and the seal pack are in sliding contact with each other and other portions of the seal pack carrier and the seal pack define a high pressure plenum which abuts the downstream side of the seal pack,
    wherein first flow communication means are provided between the high pressure plenum and a region of the gas turbine engine which, during operation of the gas turbine engine, contains fluid at higher pressure than fluid in the downstream region adjacent the seal such that a force is applied to the seal pack in the upstream direction.

9. A gas turbine engine as claimed in claim 8 wherein the first flow communication means are provided between the upstream region adjacent the seal and the high-pressure plenum.

10. A gas turbine engine as claimed in claim 8 wherein the first flow communication means are provided between a separate high-pressure region and the high-pressure plenum.

* * * * *